March 25, 1952  G. L. DEVEREAUX  2,590,385
IMPLEMENT HITCH FOR TRACTORS
Filed May 24, 1950
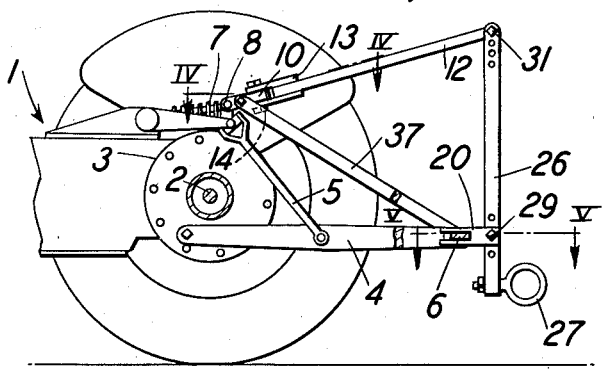
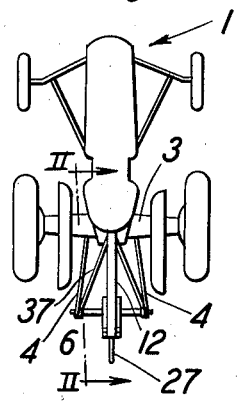
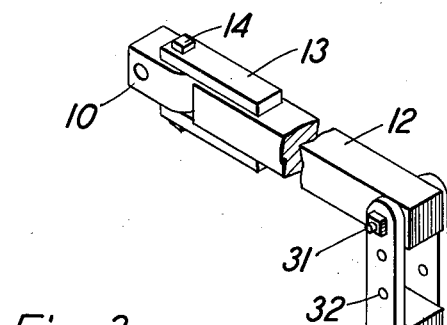
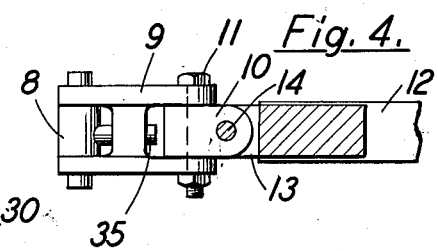
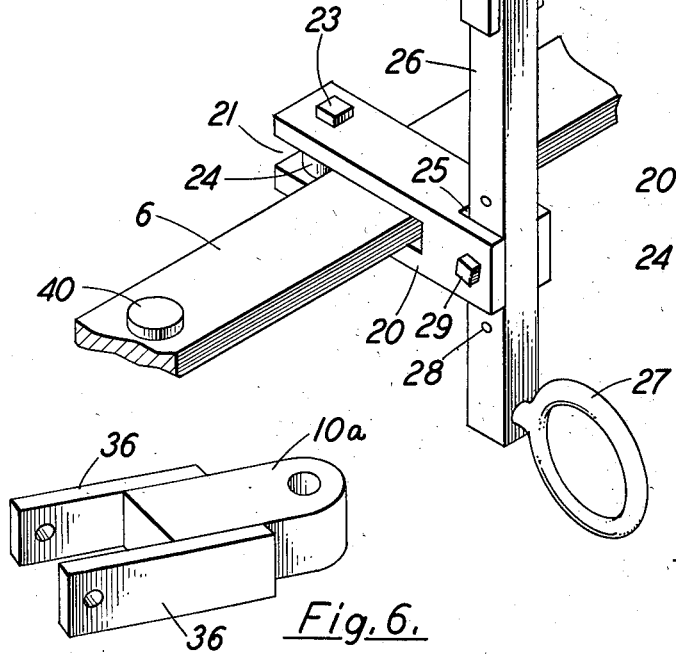
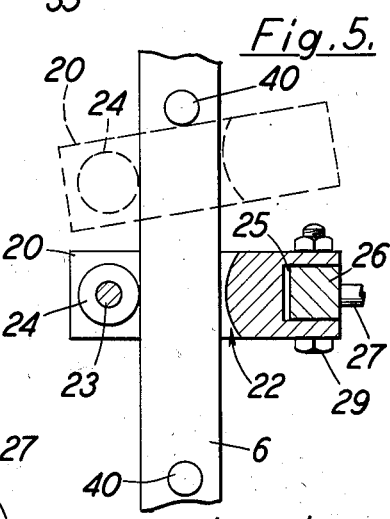
Inventor
Guy L. Devereaux
By
Attorney Patented Mar. 25, 1952

2,590,385

UNITED STATES PATENT OFFICE 2,590,385

IMPLEMENT HITCH FOR TRACTORS

Guy L. Devereaux, Edmore, Mich.

Application May 24, 1950, Serial No. 163,958

3 Claims. (Cl. 280—33.44)

1

This invention relates to agricultural implements and more particularly to a hitch mountable on a tractor of the Ford-Ferguson type for attaching implements to the tractor.

Tractors equipped with the Ford-Ferguson type implement lift are seriously limited not only in the types of implements to which they may be attached but in the amount of load which they will draw. They are also subject to the danger of the tractor tipping backwardly about its rear axle under heavy loads. Various other types of tractors are also subject to these disadvantages to a greater or lesser degree. My invention is particularly designed to overcome each of these disadvantages in such tractors.

The standard Ford-Ferguson implement attachment and lift mechanism provides a hydraulic cylinder usable for both elevating the implement and for forcing the implement down against the earth being worked. The attachment mechanism or hitch is provided with a special release mechanism designed to trip upon the attaining of a predetermined load whereby the hydraulic cylinder will release the downward pressure upon the implement and raise it to relieve excessive drag upon the tractor. Due to this relief mechanism, the load upon the tractor is maintained within limits which will not cause the front end of the tractor to pivot upwardly about its rear axle. This relief mechanism is a safety device against tipping the tractor rather than a safety device against overloading the tractor. Therefore, due to this release, the potential draft capacity of the tractor is greatly reduced, making it substantially useless for moving the heavy loads which the power capacity of the tractor would otherwise permit.

When, however, the trip mechanism for relieving the hydraulic cylinder is deactivated and a standard implement hitch substituted, the danger of tipping becomes very serious. Particularly does this become a major problem when the tractor is climbing a side hill. The arrangement of this standard implement hitch is such that the links mounted below the center of the rear axle have a forward thrust and the links attached above the rearward axle have a rearward drag. Since the weight of the forward end of these tractors is frequently insufficient to overcome the force couple thereby established about the rear axle, the front end will rise and pivot upwardly about the rear axle. Due to this tendency to tip rearwardly about the rear axle, the full draft capacity of the tractor cannot be utilized by means of either a standard hitch or the conventional Ford-Ferguson type hitch. My invention overcomes this difficulty. My invention, besides overcoming this danger of tipping, increases the traction of the rear wheels, thus further increasing the draft capacity of the tractor.

My invention provides a simple and inexpensive means for adapting a Ford-Ferguson type tractor to use with substantially any type of implement irrespective of its form or design. My invention also makes it possible, even though the implement being drawn is not necessarily designed to be used with a Ford-Ferguson type tractor, to turn a corner with these implements both easily and over a relatively short radius. All of this may be done without modifying the tractor and by means of a hitch of simple and economical design.

Although I have discussed my hitch primarily as applied to Ford-Ferguson tractors, I wish it to be understood that this is for illustrative purposes only. My improved tractor hitch may be used advantageously with substantially any make or type of tractor for overcoming the difficulties outlined above.

It is, therefore, a primary object of my invention to provide an implement hitch for a tractor which will prevent the tractor from tipping and will permit the tractor to develop its maximum possible draft capacity.

It is a further object of my invention to provide an implement hitch which will adapt tractors equipped with specialized hitches to use with any type or make of equipment.

It is an additional object of my invention to provide such an implement hitch which will not require modification of the tractor.

These and other objects of my invention will be immediately seen by those acquainted with the design and construction of agricultural equipment upon reading the following specification and the accompanying drawings.

In the drawings:

Figure 1 is a plan view of a tractor equipped with my improved implement hitch.

Figure 2 is a sectional, elevation view taken along the plane II—II of Figure 1.

Figure 3 is an enlarged, fragmentary, oblique view of my improved tractor hitch.

Figure 4 is an enlarged, fragmentary, sectional view of my improved tractor hitch taken along the plane IV—IV of Figure 2.

Figure 5 is an enlarged, fragmentary, sectional view taken along the plane V—V of Figure 2 and indicating the travel of my improved tractor hitch along the draw bar during a turn.

Figure 6 is an enlarged, oblique view of a coupling used in mounting my improved tractor hitch to tractors of non-Ford-Ferguson type construction.

In executing the objects and purposes of my invention I have provided a hitch designed to reverse the normal force couple generated about the rear axle of the tractor whereby the front end of the tractor is urged downwardly with increased force as the load drawn by the tractor increases. To this end I have provided a vertical arm and an inclined arm. The vertical arm, adjacent its lower end, is pivotally and slidably mounted to the draw bar of a tractor and at its upper end is mounted to the inclined arm. The forward end of the inclined arm is mounted to the tractor substantially above the center line of the rear axle. The draw bar is attached to the tractor below the tractor's rear axle. Means for attaching the implements is provided on the vertical arm substantially below the point of pivotal attachment of the vertical arm to the draw bar whereby the draw bar is urged away from the tractor and the inclined arm is urged toward the tractor. This creates a force couple about the rear axle urging the front end of the tractor downwardly.

In the following description the terms "upwardly" and "downwardly" are frequently used and are to be taken as meaning "upwardly" toward the top of the tractor as the invention appears in Figure 2 and "downwardly" away therefrom. The terms "forwardly" and "rearwardly" are also frequently used and are to be taken as meaning "forwardly" toward the front of the tractor and "rearwardly" away therefrom.

Referring now to the drawings in greater detail, the numeral 1 indicates a tractor having a rear axle 2 enclosed by a housing 3. Below the rear axle 2 a pair of draft arms 4 are mounted to the housing 3, one on each side of the center line of the tractor. Each of the draft arms 4 is supported by a tie rod 5 and a stay bar 37. A draw bar 6 is mounted between the draft arms 4 at their rearward extremities. Although the draw bar 6 may be of any suitable shape, it is preferably of rectangular cross section having its greater dimension positioned substantially horizontally.

The housing 3, substantially above the rear axle 2, is provided with the conventional Ford-Ferguson hydraulic cylinder and piston. These parts are not described in detail and are not illustrated inasmuch as they are conventional and form no part of my invention. Surrounding the piston there is the standard Ford-Ferguson spring 7 controlling the release mechanism when the tractor is used with a standard Ford-Ferguson implement hitch. At the rearward end of the spring 7 the tractor is equipped with an anchor lug 8 which is also of standard design and constitutes standard equipment for this type of tractor. An H-shaped fitting 9 is mounted to the anchor lug 8. A rod 35 attached to the anchor lug 8 extends through the cross bar of the fitting 9 to restrain the fitting 9 against vertical pivotal movement about the lug 8. A coupler 10 is pivotally attached to the fitting 9 by means of a bolt 11 (Fig. 4). The pivotal attachment between the coupler 10 and the fitting 9 permits the coupler to rotate in a vertical plane about the bolt 11.

When the tractor is of a type other than Ford-Ferguson, the spring 7 and the hydraulic cylinder and piston will not be present. In this case the attachment is made directly to a lug projecting from the upper portion of the housing 3. The fitting 9 is not used but the coupler 10a (Fig. 6) is modified to the extent of having a pair of spaced arms 36 projecting forwardly to engage the lug and take the place of the fitting 9.

The link element 12 is equipped with a bifurcated forward end 13 for receiving the coupler 10. The link element 12 is mounted to the coupler 13 by means of the bolt 14 whereby the link element may pivot horizontally in relation to the coupler 10. Thus, the link element 12 is free to pivot both vertically and laterally. The length of the link element 12 is such that its rearward end extends rearwardly beyond the draw bar 6.

A yoke 20 is mounted on the draw bar 6. The yoke 20 is bifurcated on its forward end to receive the draw bar 6 within the slot 21. The wall 22 forming the blind end of the slot 21 is arcuate to provide clearance between the draw bar 6 and this wall. The draw bar 6 is enclosed within this slot 21 by means of the bolt 23 and the roller 24 mounted on the bolt 23. A space greater than the width of the draw bar 6 is left between the roller 24 and the wall 22 for purposes which will appear more fully hereinafter.

At its rearward end, the yoke 20 is equipped with a channel 25 perpendicular to the slot 21 to form a vertical opening for receiving the lever element 26. A substantial clearance is provided between the end wall of the slot 25 and the lever element 26 whereby the lever element may pivot within the slot 25 without binding.

The lever element 26, at its lower end, is provided with a rearwardly extending coupler ring 27 for attachment of implements. Above, but adjacent to the coupler element 27 three spaced holes 28 are provided through the lever element 26. More than three holes 28 may be provided if such is desired. A bolt 29 is passed through one of the holes 28 for pivotally anchoring the lever element 26 to the yoke 20. The purpose of providing the additional holes 28 will appear more fully hereinafter. The upper end 30 of the lever element 26 is bifurcated to receive the rearward end of the link element 12. The upper end 30 of the lever element 26 and the rearward end of the link element 12 are pivotally joined by means of the bolt 31. A number of equally spaced holes 32 are provided for the bolt 31 through the upper end 30 of the lever element 26. Only one pair of the holes 32 will be used at any one time. The length of the lever element 26 is such that when the link element 12 is attached to its upper end, the link element is inclined downwardly at a substantial angle in a forward direction.

*Assembly and operation*

If the tractor is of the Ford-Ferguson type, the conventional Ford-Ferguson implement hitch is removed from the tractor except for the draft arms 4, tie rods 5, stay bars 37 and draw bar 6. My improved hitch is then installed by removing the bolt 23 and roller 24 and seating the yoke 20 over the draw bar 6. The roller 24 is then put in place and the bolt 23 installed to secure the yoke to the draw bar 6. The coupler 10 is seated within the fitting 9 and the bolt 11 installed. With the securing of the bolt 11 my improved hitch is ready for operation. When my hitch is mounted to a tractor other than that of the Ford-Ferguson type, the attachment of the hitch is substantially the same except that the coupler 10a is substituted for the coupler 10 and fitting 9.

Any suitable implement such as a wagon is attached to the hitch by means of the coupler ring 27. As the tractor 1 starts to move forwardly the drag exerted by the implement pulls the ring 27 rearwardly pivoting the lever arm 26 about the bolt 29, thus creating a downward and forward compression load in the link member 12. Since the forward thrust of the link member 12 acts upon the tractor 1 substantially above the center line of the rear axle 2, this thrust acts to rotate the tractor forwardly about the rear axle and to force downwardly the front end of the tractor. At the same time, the yoke 20 exerts a substantial rearward pull on the draft arms 4. Since the draft arms 4 are each anchored to the tractor 1 below the center line of the rear axle 2, this rearward pull of the draft arms 4 tends to rotate the body of the tractor 1 in the same direction as the thrust on the link elements 12, further aiding in forcing the front end of the tractor down. The greater the drag imposed upon the coupler ring 27, the greater the rotational couple generated about the rear axle 2. Thus, the tractor has no tendency to raise its front end. At the same time this arrangement of the forces about the center of the rear axle increases the downward pressure upon the rear axle, giving the rear wheels of the tractor greater traction.

The distribution of the loads generated by the drag on the coupler ring 27 may be changed by varying the spacing between the yoke 20 and the link element 12 or between the coupler ring 27 and the yoke 20. It is for this reason that the additional holes 28 and 32 are provided in the lever element 26. The forward thrust on the link element 12 may be increased by attaching the lever element 26 to the yoke 20 by means of the uppermost of the holes 28, or decreased by making a similar attachment by means of the lowermost of the holes 28. In a similar manner, the amount of forward thrust generated in the link element 12 may be changed by using a different one of the holes 32 for attaching the link element to the lever element.

In order to obtain the full benefit of the force couple generated by means of my improved implement hitch, the trip mechanism normally used to release the hydraulic cylinder is deactivated. The anchor lug 8 then serves to transmit to the tractor housing the entire thrust load generated in the link element.

My improved tractor hitch is pivotally mounted to the tractor at the forward end of the link element 12. It is also free for limited travel along the draw bar 6. Thus, my implement hitch may swing to each side of center when the tractor is turning. This both facilitates turning and reduces the radius of the turn. This also materially reduces the lateral drag imposed upon the hitch. The use of the roller 24 allows the yoke 20 to move freely along the draw bar 6. The curved wall 22 of the slot 21 prevents binding between this wall and the draft bar 6 as the alignment of the yoke 20 varies from a position perpendicular to the draw bar 6. The length of travel along the draw bar may be governed either by the use of stops 40 (Figs. 3 and 5) placed upon the draw bar 6 to contact the yoke 20 or by means of the spacing provided between the wall 22 and the draw bar 6. The use of the stops 40 is preferable since it reduces the wear which will otherwise occur between the draw bar 6 and the wall 22. The stops 40 are mounted to the draw bar by means of a depending stud extending through a hole in the draw bar. A nut is used to secure the stops 40 in place.

By designing the implement hitch to consist of a single vertical member, a yoke 20 and a single link element 12, the hitch is reduced to simple form for fabrication and yet may be made sturdy enough to withstand all normal loads incident to its use. The various parts making up my improved tractor hitch may be made from any suitable material having the required strength. Preferably they are made from steel.

I have described my improved tractor hitch and its operation. Numerous modifications of my tractor hitch may be made, each without departing from the principle of my invention. Each of these modifications is to be considered as included in the hereinafter appended claims unless these claims by the language expressly provide otherwise.

I claim:

1. In a rearwardly extending hitch for a tractor, said tractor having a draw bar mounted to said tractor below the rear axle thereof, said hitch comprising: a substantially vertical lever element; a link element having a rearward end and a forward end; at a point on said tractor spaced substantially above said rear axle, means for attaching the forward end of said link element to said tractor for pivotal movement laterally of said tractor; means for pivotally attaching said link element to said lever element adjacent the upper end of said lever element; an implement hitch mounted to the lower end of said lever element; said lever element adjacent its lower end and above said implement hitch anchored to said draw bar for vertical pivotal movement about said draw bar and lateral sliding movement along said draw bar.

2. A hitch for a tractor as described in claim 1 wherein said lever element is anchored to said draw bar by means of a yoke pivotally attached to said lever element; the walls of said yoke defining a slot open at one end for slidably receiving said draw bar; a roller mounted in said slot adjacent the open end thereof for retaining said draw bar in said slot.

3. In a rearwardly extending hitch for a tractor, said tractor having a draft arm mounted on one of its ends below the rear axle of said tractor, a draw bar mounted on the other of the ends of said draft arm, said hitch comprising: a lever element having an upper end and a lower end; an implement hitch attached to the lower end of said lever element; means for attaching said lever element adjacent its lower end to said draw bar for vertical pivotal and lateral sliding movement about said draw bar; a link element having a forward end and a rearward end; the upper end of said lever element bifurcated for receiving the rearward end of said link element; means for pivotally attaching said link element to said lever element; means for attaching the forward end of said link element to said tractor at a point spaced substantially above said rear axle for vertical and lateral pivotal movement.

GUY L. DEVEREAUX.

REFERENCES CITED

The following references are of record in the file of this patent:

UNITED STATES PATENTS

| Number | Name | Date |
|---|---|---|
| 2,025,820 | Miller | Dec. 31, 1935 |
| 2,432,739 | Ferguson | Dec. 16, 1947 |
| 2,465,641 | Gardner | Mar. 29, 1949 |

FOREIGN PATENTS

| Number | Country | Date |
|---|---|---|
| 621,394 | Great Britain | Apr. 8, 1949 |